US008652985B2

(12) United States Patent
Wakizoe et al.

(10) Patent No.: US 8,652,985 B2
(45) Date of Patent: Feb. 18, 2014

(54) ELECTRODE CATALYST LAYER FOR USE IN FUEL CELL

(75) Inventors: Masanobu Wakizoe, Tokyo (JP); Naoto Miyake, Kamakura (JP)

(73) Assignee: Asahi Kasei Kabushiki Kaisha, Osaka (JP)

(*) Notice: Subject to any disclaimer, the term of this patent is extended or adjusted under 35 U.S.C. 154(b) by 1462 days.

(21) Appl. No.: 12/337,571

(22) Filed: Dec. 17, 2008

(65) Prior Publication Data

US 2009/0104498 A1 Apr. 23, 2009

Related U.S. Application Data

(62) Division of application No. 10/488,945, filed as application No. PCT/JP02/09165 on Sep. 9, 2002, now abandoned.

(30) Foreign Application Priority Data

Sep. 10, 2001 (JP) ................................. 2001-273579

(51) Int. Cl.
*H01M 4/88* (2006.01)
*H01M 4/02* (2006.01)
*H01M 4/36* (2006.01)
*H01M 4/90* (2006.01)

(52) U.S. Cl.
USPC ........................... 502/101; 429/523; 429/528

(58) Field of Classification Search
USPC ....................................................... 502/101
See application file for complete search history.

(56) References Cited

U.S. PATENT DOCUMENTS

| | | | |
|---|---|---|---|
| 6,297,180 B1 | 10/2001 | Maier | |
| 6,319,876 B1 | 11/2001 | Maier | |
| 6,416,898 B1* | 7/2002 | Ohzu et al. | 429/492 |
| 7,871,740 B2* | 1/2011 | Tamura et al. | 429/532 |
| 2002/0001744 A1 | 1/2002 | Tsusaka et al. | |
| 2004/0053111 A1* | 3/2004 | Matsumoto | 429/42 |
| 2004/0053113 A1* | 3/2004 | Nishikawa et al. | 429/44 |
| 2004/0124079 A1* | 7/2004 | Gestermann et al. | 204/290.14 |

FOREIGN PATENT DOCUMENTS

DE 19506843 A1 8/1996
EP 1 085 038 A1 3/2001
(Continued)

OTHER PUBLICATIONS

"Analysis of Proton Exchange Membrane Fuel Cell Performance With Alternate Membranes", Masanobu Wakizoe et al. Electrochimica Acta, vol. 40, No. 3 (1995), pp. 335-344.*

(Continued)

*Primary Examiner* — Patricia L Hailey
(74) *Attorney, Agent, or Firm* — Birch, Stewart, Kolasch & Birch, LLP

(57) ABSTRACT

An electrode catalyst layer for use in a fuel cell, the layer having a composite particle material in which catalyst particles are supported on conductive particles, a proton conductive polymer and a metal oxide, wherein said metal oxide is non-particulate.

10 Claims, 8 Drawing Sheets

(56) References Cited

FOREIGN PATENT DOCUMENTS

| JP | 06-111827 A | 4/1994 |
|---|---|---|
| JP | 06-111834 A | 4/1994 |
| JP | 07-326361 A | 12/1995 |
| JP | 2000-357524 A | 12/2000 |
| JP | 2001-11219 A | 1/2001 |
| JP | 2001-35509 A | 2/2001 |
| JP | 2001-102071 A | 4/2001 |
| JP | 2001-307545 A | 11/2001 |
| JP | 2002-231270 A | 8/2002 |
| JP | 2002-309016 A | 10/2002 |
| WO | WO-01/20700 A2 | 3/2001 |

OTHER PUBLICATIONS

Mauritz et al., ACS Symposium Series No. 395, p. 401-417, American Chemical Society, Washington, DC (1989).
Miyake et al., Journal of the Electrochemical Society, 148 (8) A898-904 (2001).
Wikipedia definition for "Sol-gel".
Wikipedia definition for "Silicon Dioxide".
Wikipedia definition for "Siloxane".

\* cited by examiner

ELECTRODE CATALYST LAYER FOR USE IN FUEL CELL

CROSS-REFERENCE TO RELATED APPLICATIONS

This application is a Divisional of co-pending application Ser. No. 10/488,945 filed on Mar. 9, 2004 and for which priority is claimed under 35 U.S.C. §120. Application Ser. No. 10/488,945 is the national phase of PCT International Application No. PCT/JP02/09165 filed on Sep. 9, 2002 under 35 U.S.C. §371 which claims priority of Japanese Patent Application No. 2001-273579 filed Sep. 10, 2001. The entire contents of each of the above-identified applications are hereby incorporated by reference.

TECHNICAL FIELD

The present invention relates to an electrode catalyst layer for use in a solid polymer type fuel cell.

BACKGROUND ART

A fuel cell is a device which, by electrochemically oxidizing hydrogen, methanol and the like in the cell, converts the chemical energy of the fuel directly into electric energy and takes out the energy; fuel cells are attracting attention as a clean electric energy supply source. In particular, solid polymer type fuel cells are expected as an alternative source of power for vehicles, a household cogeneration system, and an electric power generator for cellular phones since they operate at low temperatures as compared to other type cells.

Such a solid polymer type fuel cell comprises a membrane/electrode assembly (hereinafter referred to as MEA) in which a pair of catalyst layers are bonded to both surfaces of a proton exchange polymer membrane. More specifically, an anode catalyst layer is provided on one surface of the proton exchange polymer membrane, and a cathode catalyst layer is provided on the other surface of the same membrane. Additionally, an assembly having a structure in which further a pair of gas diffusion layers placed respectively on both outside surfaces of the catalyst layers is also referred to as an MEA.

The anode and cathode catalyst layers have hitherto been sheets made of a mixture comprising a carbon black powder made to support catalyst particles and a proton conductive polymer; among others, in a preparation method, the catalyst layers are bonded to the proton exchange polymer membrane by heat pressing. Incidentally, an electrode assembly having a structure in which such catalyst layers are laminated with gas diffusion layers is generally referred to as a gas diffusion electrode.

A fuel (for example, hydrogen) is supplied to a gas diffusion electrode as the anode, an oxidant (for example, oxygen and air) is supplied to a gas diffusion electrode as the cathode, and a fuel cell comes into operation when both electrodes are connected to an external circuit. Specifically, when hydrogen is used as fuel, hydrogens are oxidized on the anode catalyst to produce protons. The protons thus produced pass through the proton conductive polymer portion in the anode catalyst layer, thereafter migrate through the proton exchange polymer membrane, then pass through the proton conductive polymer portion in the cathode catalyst layer, and thus get onto the cathode catalyst. On the other hand, the electrons generated concurrently with the protons by the oxidation of hydrogens pass through the external circuit and reach the cathode gas diffusion electrode, where the electrons react with the above described protons and the oxygen in an oxidant to generate water, where electric energy can be taken out.

The electric power generation performance of a fuel cell largely depends on the water content regulation in the proton exchange polymer membrane, and in the gas diffusion electrodes of the anode and cathode. Specifically, when the proton exchange polymer membrane is dehumidified, the proton conductance thereof is remarkably decreased and the internal resistance of the cell is increased, resulting in a degradation of the electric power generation performance.

Additionally, when the proton conductive polymer portions constituting the gas diffusion electrodes of the anode and cathode are dehumidified, the internal resistances of the gas diffusion electrodes are increased, and concurrently the activation overvoltage is increased, resulting in a degradation of the electric power generation performance. In particular, in the anode section, when the protons migrate from the anode section to the cathode section through the proton exchange polymer membrane, the protons are accompanied by water molecules, so that the water content of the anode section becomes deficient. Consequently, the proton conductive polymer portion in the anode section tends to be dehumidified, and accordingly the proton migration is suppressed to form a water concentration gradient within the proton exchange polymer membrane and thus the decrease of the proton conductance takes place.

Although, on the other hand, from the viewpoint of simplification of the fuel cell system, it is preferable to operate the fuel cell under the condition of low humidification as possible. As described above there has been the problem that no satisfactory electric power generation performance can be attained unless the proton exchange polymer membrane and the gas diffusion electrodes in the anode and cathode sections are sufficiently humidified.

For the purpose of overcoming the above described problem, JP-A-06-111827 proposes a method in which particulate and/or fibrous silica is contained as a water absorbing material in the anode catalyst layer and/or the cathode catalyst layer (hereinafter referred to as the mixing method), JP-A-06-111834 proposes a method in which particulate and/or fibrous silica is contained in the proton exchange polymer membrane and JP-A-07-326361 proposes a catalyst layer formed by use of a water absorbing material. By use of these techniques, the water holding capacities of the proton exchange polymer membrane and the gas diffusion electrodes in the anode and cathode sections can be increased, and accordingly the water content control can be made easier to some extent.

However, such particulate or fibrous water absorbing material serves to improve the water holding capacity, but at the same time causes the increase in electric resistance and the decrease in gas permeability; thus there is a limit in the effect brought about by such a material. There is an additional problem that when the amount of such a material is increased, the catalyst layers and the proton exchange polymer membrane become brittle, and the catalyst layers cannot bond to the proton exchange polymer membrane. Accordingly, from a practical standpoint, the water content cannot be said to become sufficiently easy to control, such that even when a fuel cell is operated under a condition of low humidification, the effect brought about by such a material has been found to be small (see Comparative Examples 2 to 5).

Incidentally, there has been reported a composite membrane (hereinafter referred to as a sol-gel membrane) in which silica is contained in a perfluorocarbon based ion exchange membrane by taking advantage of the sol-gel reaction. Specifically, a perfluorocarbon based ion exchange membrane is soaked and swollen in an aqueous solution of an alcohol, such as methanol, and thereafter a mixed solvent comprising a tetraethoxysilane (which is a metal alkoxide) and an alcohol is added, and the tetraethoxysilane is subjected to hydrolysis/polycondensation reactions with the aid of the catalytic action of the acidic group. Thus, silica is produced uniformly in the ion exchange membrane (K. A. Mauritz, R. F. Storey and C. K. Jones, in Multiphase Polymer Materials: Blends and Ionomers, L. A. Utracki and R. A. Weiss, Editors, ACS Symposium Series No. 395, P. 401, American Chemical Society, Washington, D.C. (1989)).

However, it has been reported that the water holding capacity under a low humidification condition is only slightly improved, even with an increased amount of silica incorporated. Further, the effect of improving the water holding capacity is small and additionally the proton conductance is decreased (N. Miyake, J. S. Wainright, and R. F. Savinell, Journal of the Electrochemical Society, 148(8), A898-904 (2001)). Accordingly, even when a fuel cell is operated under a low humidification condition, the effect brought about by the sol-gel membrane has been found to be small (see Comparative Example 6).

DISCLOSURE OF THE INVENTION

An object of the present invention is to make a satisfactory electric power generation performance obtainable even when a fuel cell is operated under a condition of low humidification or humidity.

The present inventors, as a result of a diligent study for the purpose of overcoming the above described problems, found that an electrode catalyst layer, comprising a composite particle material in which catalyst particles are supported by conductive particles, a proton conductive polymer, and a metal oxide which is non-particulate, displays a high water holding capacity and can maintain the proton conductivity at a low humidity. Additionally, the present inventors found that because the above described metal oxide is non-particulate, there are no increase in electric resistance and no decrease in gas permeability, and accordingly the electric power generation performance of the fuel cell under a low humidification condition is improved.

As a method for obtaining such an electrode catalyst layer, the present inventors found a method in which the non-particulate metal oxide is formed, for example, in the following way: after a polymer-containing aggregate containing a composite particle material and a proton conductive polymer has been formed, a metal oxide precursor is subjected to hydrolysis and polycondensation reactions in the proton conductive polymer. Surprisingly, it has been found that by using this method, it has become possible to form the metal oxide in an amount exceeding 100 mass % in relation to the proton conductive polymer, and the electric power generation performance under a low humidification condition is dramatically improved. In other words, the present invention is described as follows:

(1) An electrode catalyst layer for use in a fuel cell, the layer comprising a composite particle material in which catalyst particles are supported by conductive particles, a proton conductive polymer, and a metal oxide, wherein the above described metal oxide is non-particulate.

(2) The electrode catalyst layer described in (1), wherein part of the surface of the above described catalyst particles is coated with the proton conductive polymer.

(3) The electrode catalyst layer described in (1) or (2), wherein the above described proton conductive polymer contains the above described metal oxide.

(4) The electrode catalyst layer described in any one of (1) to (3), wherein the above described metal oxide is silica.

(5) The electrode catalyst layer described in any one of (1) to (4), wherein the content of the above described metal oxide is 0.001 mg/cm$^2$ or more and 10 mg/cm$^2$ or less in terms of the loading amount in relation to the projected area of the electrode.

(6) The electrode catalyst layer described in any one of (1) to (5), wherein the above described metal oxide is obtained by subjecting a metal oxide precursor to hydrolysis and polycondensation reactions.

(7) The electrode catalyst layer described in any one of (1) to (6), which is obtained by a method comprising at least the following steps of:

(a) forming a polymer-containing aggregate containing the above described composite particle material and the above described proton conductive polymer; and (b) thereafter converting the above described metal oxide precursor into the above described metal oxide by impregnating into the aggregate the metal oxide precursor corresponding to the above described metal oxide, and successively by subjecting the precursor to the hydrolysis and polycondensation reactions.

(8) A gas diffusion electrode, comprising the electrode catalyst layer described in any one of (1) to (7).

(9) A membrane/electrode assembly, comprising the electrode catalyst layer described in any one of (1) to (7).

(10) A solid polymer type fuel cell, comprising the electrode catalyst layer described in any one of (1) to (7).

BEST MODE FOR CARRYING OUT THE INVENTION

Figure 1:
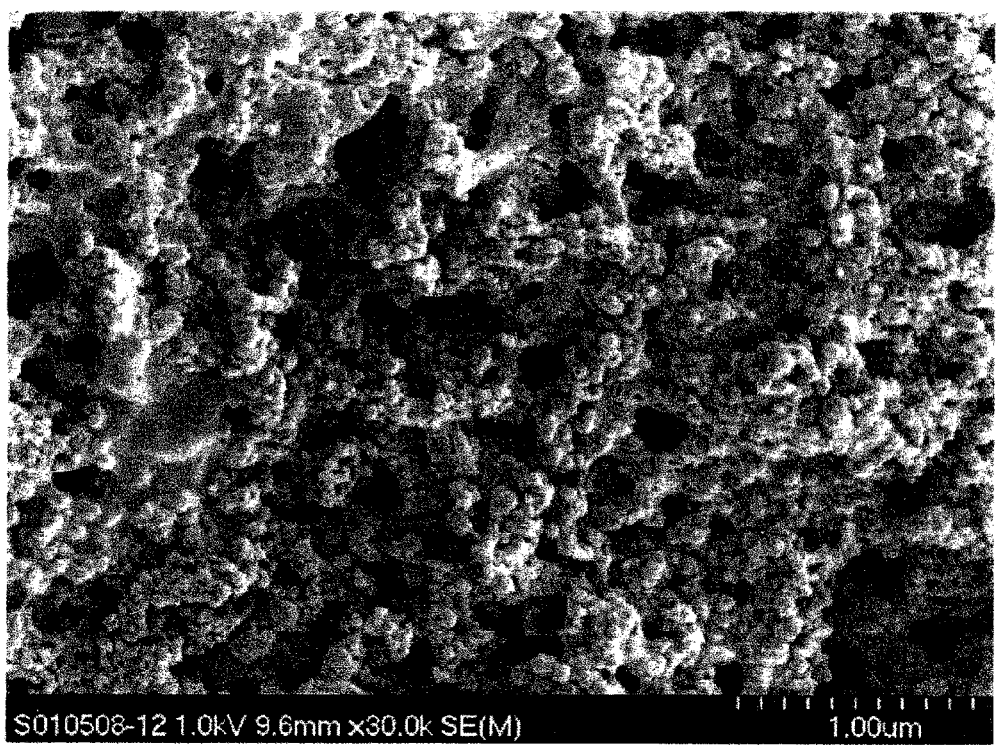
FIG. 1 is a microgram of the surface of an electrode catalyst layer of a blank electrode obtained using a scanning electron microscope (hereinafter referred to as SEM)

Detailed description will be made below on the electrode catalyst layer of the present invention for use in the fuel cell.
Electrode Catalyst Layer The electrode catalyst layer of the present invention for use in the fuel cell at least comprises an aggregate of a composite particle material in which catalyst particles are supported by conductive particles, a proton conductive polymer and a non-particulate metal oxide. Although no particular constraint is imposed, it is preferable that part of the surface of the above described catalyst particles is coated with the proton conductive polymer, and furthermore it is preferable that the above described proton conductive polymer contains the above described metal oxide.

The conductive particle material can be any type as far as it has a conductivity; the material used can be carbon black materials such as furnace black, channel black and acetylene black; activated carbon; graphite; and various metals. The particle size of each of these conductive particle materials is preferably 10 angstroms or more and 10 μm or less, more preferably 50 angstroms or more and 1 μm or less, and most preferably 100 angstroms or more and 5,000 angstroms or less.

The catalyst particle material is the catalyst which oxidizes on the anode the fuel (for example, hydrogen) and makes protons to be easily produced, and makes on the cathode the protons, electrons and oxidant (for example, oxygen and air) react with each other to generate water. Although no particular constraint is imposed on the catalyst type, platinum is preferably used. For the purpose of enhancing the tolerance of platinum against impurities, such as CO, preferably used are the catalysts in which platinum is added or alloyed with ruthenium and the like.

Although no particular constraint is imposed on the catalyst particle size, the catalyst particle size is preferably 10 angstroms or more and 1,000 angstroms or less, more preferably 10 angstroms or more and 500 angstroms or less, and most preferably 15 angstroms or more and 100 angstroms or less. The loading amount of the catalyst particle material in relation to the projected area of the electrode is, in the state such that the electrode catalyst layer has been formed, preferably 0.001 mg/cm$^2$ or more and 10 mg/cm$^2$ or less, more preferably 0.01 mg/cm$^2$ or more and 5 mg/cm$^2$ or less, and most preferably 0.1 mg/cm$^2$ or more and 1 mg/cm$^2$ or less. Additionally, it is typical that such composite particles are bonded together to constitute the fundamental skeleton of an electrode catalyst layer. As the bonding agents, there can be used fluorocarbon resins such as polytetrafluoroethylene (PTFE) and tetrafluoroethylene-perfluoroalkylvinyl ether copolymer, but proton conductive polymer and the like described below can be also used.

The proton conductive polymer is a polymer which has proton conductive functional groups. Examples of the proton conductive functional groups include a sulfonic acid group, carboxylic acid group, phosphonic acid group, and phosphoric acid group. Examples of the polymer skeleton include hydrocarbon based polymers such as polyolefin and polystyrene, and perfluorocarbon polymers. Among these polymers, preferable are the perfluorocarbon polymers, which are excellent in resistance to oxidation and heat resistance, represented by the following formula:

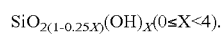

(2)

where $X^1$, $X^2$ and $X^3$ are each independently a halogen or a perfluoroalkyl group having 1 or more and 3 or less carbon atoms, a stands for an integer of 0 or larger and 20 or smaller, b stands for an integer of 0 or larger and 8 or smaller, c is 0 or 1, d, e and f are each independently integers of 0 or larger and 6 or smaller (with a constraint such that d+e+f is different from 0), g is an integer of 1 or larger and 20 or smaller, $R^1$ and $R^2$ are each independently a halogen, or a perfluoroalkyl group having 1 or more and 10 or less carbon atoms, or a fluorochloroalkyl group having 1 or more to 10 or less carbon atoms, and $X^4$ is COOH, SO$_3$H, PO$_3$H$_2$ or PO$_3$H.

No particular constraint is imposed on the equivalent weight EW (the number of grams in dryness of the proton conductive polymer in relation to one equivalent of the proton exchange group) of the proton conductive polymer, but the equivalent weight is preferably 500 or more and 2,000 or less, more preferably 600 or more and 1,500 or less, and most preferably 700 or more and 1,200 or less. No constraint is imposed on the content of the proton conductive polymer made to be present in the electrode catalyst layer, but in terms of the loading amount in relation to the projected area of the electrode and in the state such that the electrode catalyst layer has been formed, the content is preferably 0.001 mg/cm$^2$ or more and 10 mg/cm$^2$ or less, more preferably 0.01 mg/cm$^2$ or more and 5 mg/cm$^2$ or less, and most preferably 0.1 mg/cm$^2$ or more and 2 mg/cm$^2$ or less. Additionally, the content is, in terms of the mass ratio in relation to the loading amount of the catalyst particle material, preferably 0.001 or more and 50 or less, more preferably 0.1 or more and 10 or less, and most preferably 0.5 or more and 5 or less.

No particular constraint is imposed on the metal oxide, preferable is an inorganic material comprising as a constituent one type of compound selected from the group consisting Al$_2$O$_3$, B$_2$O$_3$, MgO, SiO$_2$, SnO$_2$, TiO$_2$, V$_2$O$_5$, WO$_3$, Y$_2$O$_3$, ZrO$_2$, Zr$_2$O$_3$ and ZrSiO$_4$. More preferable are Al$_2$O$_3$, SiO$_2$, TiO$_2$ and ZrO$_2$, among which silica (SiO$_2$) is particularly preferable. Incidentally, such metal oxide materials generally have —OH groups on the surface thereof, in such a way that sometimes the case of SiO$_2$ is given a representation that

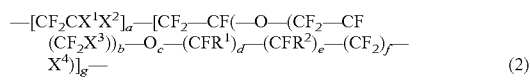

The metal oxide does not take a particulate form or a fibrous form, but is present in the electrode catalyst layer in a non-particulate form. In other words, even when observed with an optical microscope and an electron microscope, neither particulate nor fibrous metal oxide is observed. In particular, even when the electrode catalyst layer is observed at a magnification of a few hundreds of thousands times using a scanning electron microscope (SEM), neither particulate nor fibrous metal oxide is observed. Additionally, even when the electrode catalyst layer is observed at a magnification of a few hundreds of thousands times to a few millions times using a transmission electron microscope (TEM), neither particulate nor fibrous metal oxide can be clearly observed. As described above, within the scope of the existing microscopic techniques, the particles of the above described metal oxide cannot be verified.

No constraint is imposed on the content of the metal oxide, but in terms of the loading amount in relation to the projected area of the electrode and in the state such that the electrode catalyst layer has been formed, the content of the metal oxide is preferably 0.001 mg/cm$^2$ or more and 10 mg/cm$^2$ or less, more preferably 0.01 mg/cm$^2$ or more and 5 mg/cm$^2$ or less, furthermore preferably 0.1 mg/cm$^2$ or more and 3 mg/cm$^2$ or less, and most preferably 0.5 mg/cm$^2$ or more and 3 mg/cm$^2$ or less. No constraint is imposed on the mass ratio of the metal oxide to the proton conductive polymer, but the mass ratio is preferably 0.001 or more and 50 or less, more preferably 0.01 or more and 20 or less, furthermore preferably 0.1 or more and 5 or less, and most preferably 1 or more and 5 or less.

The electrode catalyst layer of the present invention may contain additives such as a conducting agent, a bonding agent and a water-repellent agent. No constraint is imposed on the conducting agent, as far as the conducting agent is an electron conductive material, and examples of the conducting agent include carbon black such as furnace black, channel black and acetylene black; activated carbon; graphite; and various metals. Examples of the bonding agent and/or the water-repellent agent include fluorocarbon resins such as polytetrafluoroethylene (PTFE) and tetrafluoroethylene-perfluoroalkylvinyl ether copolymer.

Now, a description will be made below on the method for producing the electrode catalyst layer of the present invention.

The electrode catalyst layer of the present invention can be produced by use of the so-called sol-gel reaction and by taking advantage of the pH dependence of the rates of the hydrolysis and polycondensation reactions of the metal oxide precursor. For example, the hydrolysis reaction of the metal oxide precursor under an acidic condition proceeds extremely faster than that under a neutral condition owing to the catalytic effect of the acidic condition, so that the metal oxide precursor is selectively subjected to the hydrolysis and polycondensation reactions in the neighborhood of the proton exchange groups in the proton conductive polymer, in particular, in the neighborhood of the so-called ion cluster in which a plurality of proton exchange groups are associated with each other. Accordingly, the metal oxide, produced by the hydrolysis and polycondensation reactions of the metal oxide precursor, is present in the proton conductive polymer in extremely fine forms, but does not take particulate forms or fibrous forms.

Preparation Example 1

The present preparation example comprises the step of forming a polymer-containing aggregate containing at least a composite particle material and a proton conductive polymer (hereinafter referred to as polymer-containing aggregate forming step) and the step of converting a metal oxide precursor corresponding to the above described metal oxide into said metal oxide by impregnating, into the polymer-containing aggregate, the metal oxide precursor and successively by subjecting the metal oxide precursor to the hydrolysis and polycondensation reactions (hereinafter referred to as metal oxide forming step).

(Polymer-Containing Aggregate Forming Step)

As a method for forming a polymer-containing aggregate containing at least a composite particle material and a proton conductive polymer, generally known methods can be used. Among these methods is the following method.

At the beginning, a catalyst dispersion is prepared which contains at least the composite particle material and the proton conductive polymer. No constraint is imposed on the medium for the catalyst dispersion; examples of the medium include single component mediums such as water, lower alcohols such as ethanol, ethyleneglycol, propyleneglycol, glycerin, dimethylsulfoxide, and composite mediums containing two or more of these mediums. In this connection, such a dispersion medium may contain a bonding agent, a water-repellent agent, a conducting agent and the like. By applying the dispersion thus obtained onto an ion exchange polymer membrane, a gas diffusion layer or other substrates (PTFE membrane or the like) and by drying it thereafter, the polymer-containing aggregate can be formed on the substrates.

No constraint is imposed on the type of the ion exchange polymer membrane; however, perfluorocarbon polymer is preferable similarly to the case of the above described proton conductive polymer. No constraint is imposed on the membrane thickness, but it is preferably 1 μm or more and 500 μm or less. Examples of the gas diffusion layer include conductive porous woven and nonwoven cloths such as carbon paper and carbon cloth. The polymer-containing aggregate formed on the substrate such as a film made of PTFE may be transcribed or bonded to the ion exchange polymer membrane by heat pressing or the like.

Alternatively, the polymer-containing aggregate can be formed as follows: a dispersion containing at least the proton conductive polymer is prepared and applied onto or impregnated into an aggregate composed of the composite particles supporting the catalyst particles thereon, and then dried to form the polymer-containing aggregate. The aggregate as referred to here is compatible with a gas diffusion electrode, the typical example of which is gas diffusion electrode ELAT® manufactured by E-TEK, Inc., USA.

(Metal Oxide Forming Step)

The polymer aggregates, produced as described above on various substrates, are impregnated with the metal oxide precursor and the impregnated precursor is successively subjected to hydrolysis and polycondensation reactions.

No constraint is imposed on the types of the metal oxide precursor to be used in the present invention, but preferable are alkoxides containing Al, B, P, Si, Ti, Zr or Y, among which alkoxides containing Al, Si, Ti or Zr are particularly preferable. Specific examples of the alkoxide of Al include $Al(OCH_3)_3$, $Al(OC_2H_5)_3$, $Al(OC_3H_7)_3$ and $Al(OC_4H_9)_3$; specific examples of the alkoxide containing B include $B(OCH_3)_3$; specific examples of the alkoxide containing P include $PO(CH_3)_3$ and $P(OCH_3)_3$; specific examples of the alkoxide containing Si include $Si(OCH_3)_4$, $Si(OC_2H_5)_4$, $Si(OC_3H_7)_4$ and $Si(OC_4H_9)_4$; specific examples of the alkoxide containing Ti include $Ti(OCH_3)_4$, $Ti(OC_2H_5)_4$, $Ti(OC_3H_7)_4$ and $Ti(OC_4H_9)_4$; specific examples of the alkoxide containing Zr include $Zr(OCH_3)_4$, $Zr(OC_2H_5)_4$, $Zr(OC_3H_7)_4$ and $Zr(OC_4H_9)_4$; and specific examples of the alkoxide containing Y include $Y(OC_4H_9)_3$. These may be used each alone or in combinations of two or more thereof. Additionally, the following alkoxides containing two types of metals may be used: $La[Al(i-OC_3H_7)_4]_3$, $Mg[Al(i-OC_3H_7)_4]_2$, $Mg[Al(sec-OC_4H_9)_4]_2$, $Ni[Al(i-OC_3H_7)_4]_2$, $(C_3H_7O)_2Zr[Al(OC_3H_7)_4]_2$ and $Ba[Zr_2(OC_2H_5)_9]_2$.

The impregnation amount of the metal oxide precursor is not limited, but is, in relation to 1 equivalent of the proton exchange group in the proton conductive polymer, preferably 0.01 equivalent or more and 1,000,000 equivalents or less, more preferably 0.05 equivalent or more and 500,000 equivalents or less, most preferably 0.1 equivalent or more and 100,000 equivalents or less, and furthermore preferably 0.2 equivalent or more and 20,000 equivalents or less.

The amount of water to be used for soaking the proton conductive polymer for the purpose of hydrolysis is not limited, but is, in relation to 1 equivalent of the metal oxide precursor, preferably 0.1 equivalent or more and 100 equivalents and less, more preferably 0.2 equivalent or more and 50 equivalents or less, most preferably 0.5 equivalent or more and 30 equivalents or less, and furthermore preferably 1 equivalent or more and 10 equivalents or less.

The metal oxide precursor or water may be added after having been diluted with or dissolved in another solvent. No constraint is imposed on the procedure for initiating the hydrolysis and polycondensation reactions; examples of the initiation procedure include a procedure in which at the beginning water is impregnated into the polymer-containing aggregate and thereafter the metal oxide precursor is added; a procedure in which the metal oxide precursor is impregnated into the polymer-containing aggregate and thereafter water is added; and a procedure in which a liquid containing both water and the metal oxide precursor is impregnated into the polymer-containing aggregate. When practicing these procedures, the metal oxide precursor and water may be diluted with or dissolved in another solvent, and then added.

No constraint is imposed on the reaction temperature for performing the hydrolysis and polycondensation reactions, but the reaction temperature is preferably 1° C. or above and 100° C. or below, more preferably 10° C. or above and 80° C. or below, and most preferably 20° C. or above and 50° C. or below. No constraint is imposed on the reaction time, but the reaction time is preferably 1 second or longer and 24 hours or shorter, more preferably 10 seconds or longer and 8 hours or shorter, and most preferably 20 seconds or longer and 1 hour or shorter.

By imposing the above described conditions on the metal oxide precursor, usually at the beginning, the hydrolysis reaction of the metal oxide precursor takes place, and then the polycondensation reaction proceeds.

After a predetermined period of time, the polymer-containing aggregate is taken out from the liquid, the liquid adhering to the surface thereof is removed and/or washed out according to need, and thereafter the aggregate is allowed to stand in the air at 1 to 80° C. Subsequently, according to need, the aggregate is subjected to a heat treatment at 80 to 150° C. under a dry condition and/or to a hot water treatment at 80 to 150° C., and thus the electrode catalyst layer of the present invention can be obtained.

Preparation Example 2

The present preparation example includes the step in which the metal oxide precursor is added to the solution containing at least the composite particle material and the proton conductive polymer, the solution is mixed, and thus the catalyst dispersion binder solution is prepared (catalyst dispersion binder solution preparation step), the step in which the metal oxide precursor is subjected to the hydrolysis and polycondensation reactions (metal oxide forming step), and the step in which the solvent is evaporated from the catalyst dispersion binder solution after the hydrolysis step and thus the binder solution is solidified to form the electrode catalyst layer (electrode catalyst layer forming step).

(Catalyst Dispersion Binder Solution Preparation Step)

At the beginning, a catalyst dispersion containing at least the composite particle material and the proton conductive polymer is prepared. No constraint is imposed on the type of the medium for the dispersion solution; examples of the medium include single component mediums such as water, lower alcohols such as ethanol, ethyleneglycol, propyleneglycol, glycerin, dimethylsulfoxide, and composite mediums containing two or more of these mediums. In this connection, such a dispersion may contain a bonding agent, a water-repellent agent and a conducting agent.

A metal oxide precursor, similar to that in Preparation Example 1, is added to and mixed in the dispersion to produce the catalyst dispersion binder solution. No constraint is imposed on the amount of the metal oxide precursor, but the preferable added amount of the metal oxide precursor is similar to that in Preparation Example 1. The addition of the metal oxide precursor is performed sometimes with the metal oxide precursor alone, and in some other cases with the metal oxide precursor dissolved in or diluted with another solvent. In the case where the dispersion thus produced contains water, the hydrolysis and polycondensation reactions are made to start at the same instant of time when the metal oxide precursor is added.

(Metal Oxide Forming Step)

When the catalyst dispersion binder solution is nonaqueous or the water content thereof is small, the dispersion is added with water and stirred, and thus the hydrolysis and polycondensation of the metal oxide precursor is started. At this time, water diluted with another solvent can also be added. No constraint is imposed on the amount of water; the preferable added amount of water, preferable reaction temperature and preferable reaction time are the same as those described for Preparation Example 1. The metal oxide precursor is not necessarily exhausted in the hydrolysis and polycondensation reactions; some of the precursor may remain unreacted.

(Electrode Catalyst Layer Forming Step)

The catalyst dispersion binder solution obtained in the metal oxide forming step is applied onto a variety of substrates, and then the solvent is evaporated and the applied binder solution is solidified. As the substrates, similarly to those described in Preparation Example 1, an ion exchange polymer membrane, a gas diffusion layer and other substrates such as PTFE film can be used.

Thereafter, according to need, the coated substrates are allowed to stand in the air at 1 to 80° C. Subsequently, according to need, the substrates are subjected to a heat treatment at 80 to 150° C. under a dry condition and/or a hot water treatment at 80 to 150° C., and thus the electrode catalyst layers according to the present invention can be obtained. When the electrode catalyst layer is formed on a substrate such as a film made of PTFE, the electrode catalyst layer may be transcribed and bonded to an ion exchange polymer membrane by heat pressing and the like, to form an electrode catalyst layer on the ion exchange polymer membrane.

Preparation Example 3

The present preparation example includes the step in which the metal oxide precursor is added to the solution containing at least the composite particle material and the proton conductive polymer, the solution is mixed, and thus the catalyst dispersion binder solution is prepared (catalyst dispersion binder solution preparation step), the step in which the solvent is evaporated from the catalyst dispersion binder solution and thus the binder solution is solidified to form the polymer-containing aggregate (polymer-containing aggregate forming step) and the step in which the metal oxide precursor is subjected to the hydrolysis and polycondensation reactions (metal oxide forming step).

(Catalyst Dispersion Binder Solution Preparation Step)

At the beginning, a dispersion containing the composite particle material and the proton conductive polymer is produced. No constraint is imposed on the type of the medium for the dispersion; examples of the medium include single component mediums such as lower alcohols such as ethanol, ethyleneglycol, propyleneglycol, glycerin, dimethylsulfoxide, and composite mediums containing two or more of these solvents. The water content of the dispersion is recommended to be as small as possible, and is preferably 1 ppm or more and 5 mass % or less, more preferably 1 ppm or more and 1 mass % or less, and most preferably 1 ppm or more and 1,000 ppm or less. The dispersion may contain a bonding agent, a water-repellent agent and a conducting agent.

A metal oxide precursor is added to and mixed in the dispersion to produce the catalyst dispersion binder solution. The metal oxide precursor to be used is similar to that described in Preparation Example 1. No constraint is imposed on the amount of the metal oxide precursor, but the preferable added amount of the metal oxide precursor is similar to that in Preparation Example 1. When added, the metal oxide precursor may be used alone, or may be used after having been diluted with or dissolved in another solvent.

(Polymer-Containing Aggregate Forming Step)

The catalyst dispersion binder solution produced as described above is applied onto a variety of substrates, and then the solvent is evaporated and the applied binder solution is solidified. As the substrates, similarly to those described in Preparation Examples 1 and 2, an ion exchange polymer membrane, a gas diffusion layer, and other substrates such as PTFE membrane can be used. When the polymer-containing aggregate is formed on a substrate such as a film made of PTFE, the aggregate may be transcribed and bonded to an ion exchange polymer membrane by heat pressing and the like.

(Metal Oxide Forming Step)

The polymer-containing aggregates produced on the various substrates as described are soaked in water, and the hydrolysis and polycondensation reactions of the metal oxide precursor are made to start. At this time, water diluted with another solvent may also be added. No constraint is imposed on the amount of water; the preferable added amount of water, preferable reaction temperature and preferable reaction time are the same as those described for Preparation Example 1.

After a predetermined period of time, the polymer-containing aggregate is taken out from the liquid, the liquid adhering to the surface thereof is removed and/or washed out according to need, and thereafter the aggregate is allowed to stand in the air at 1 to 80° C. Subsequently, according to need, the aggregate is subjected to a heat treatment at 80 to 150° C. under a dry condition and/or a hot water treatment at 80 to 150° C., and thus the electrode catalyst layer of the present invention can be obtained.

(Gas Diffusion Electrode)

When the electrode catalyst layer of the present invention is used in a solid polymer type fuel cell, the electrode catalyst layer is generally used as a gas diffusion electrode having a form in which a gas diffusion layer made of a conductive porous woven or nonwoven cloth, such as carbon paper and carbon cloth, is bonded onto or laminated on the electrode catalyst layer.

(MEA)

When the electrode catalyst layer of the present invention is used in a solid polymer type fuel cell, the electrode catalyst layer is used as an MEA in which at least two types of catalyst layers, namely a cathode catalyst layer and an anode catalyst layer, are respectively bonded to the two surfaces of a proton exchange polymer membrane. The electrode catalyst layer of the present invention is applied to either one of the anode and cathode, or to both of the anode and cathode. No constraint is imposed on the type of the proton exchange polymer membrane, but preferable is an ion exchange membrane made of a perfluorocarbon polymer similar to the above described proton conductive polymer. Incidentally, an assembly having a structure in which further a pair of gas diffusion layers placed respectively on both outside surfaces of the catalyst layers is also referred to as an MEA.

When the electrode catalyst layer of the present invention is formed on a proton exchange polymer membrane, the membrane can be used, as it is, as the MEA of the present invention. When the electrode catalyst layer of the present invention is formed on an ion exchange polymer membrane other than the proton type, it is necessary to convert the ion exchange polymer membrane into a proton type membrane by soaking the membrane into an acid, such as hydrochloric acid, so that the MEA of the present invention may be obtained. When the electrode catalyst layer of the present invention is formed in a gas diffusion electrode or on a gas diffusion layer, the MEA of the present invention can be produced by bonding the electrode catalyst layer to an ion exchange polymer membrane by heat pressing and the like. Similarly to the case described above, when the ion exchange polymer membrane is not of the proton type, it is necessary to convert the ion exchange polymer membrane into a proton type membrane by further soaking the membrane into an acid, such as hydrochloric acid. When the electrode catalyst layer of the present invention is formed on any other substrate (a film made of PTFE and the like), the MEA of the present invention can be produced by transcribing and bonding the electrode catalyst layer to the ion exchange polymer membrane with the aid of heat pressing and the like. When the ion exchange polymer membrane is not of the proton type, it is necessary to convert the ion exchange polymer membrane into a proton type membrane by further soaking the membrane into an acid, such as hydrochloric acid.

Fuel Cell

The solid polymer type fuel cell is composed of the MEA of the present invention, a gas diffusion layer, a bipolar plate, a backing plate and the like. Among these, the bipolar plate is a plate made of graphite, a composite material composed of graphite and a resin, or a metallic material which has grooves on the surface thereof for flowing a gas of a fuel, an oxidant or the like, and is provided with the functions for transmitting electrons into an external circuit and additionally working as flow paths for supplying the fuel and the oxidant to the neighborhoods of the gas diffusion layer and the catalyst layer. Lamination of a plurality of such bipolar plates and a plurality of MEAs intervening between the bipolar plates results in formation of a fuel cell. The operation of the fuel cell is performed eventually by supplying hydrogen to one electrode and oxygen or air to the other electrode.

The operation temperature of the fuel cell is usually 50° C. or above and 80° C. or below, in which range the water content can be easily controlled (although sometimes the fuel cell is operated at 100° C. or above and 150° C. or below because the higher the temperature is, the higher the catalyst activity is). The inside cell pressures of hydrogen and oxygen are preferably as high as possible because the reactivity is increased and hence the output power of the fuel cell is improved. But from the view point of the durability of the MEA materials, it is preferable to regulate these pressures so as to fall within appropriate pressure ranges, respectively.

The electrode catalyst layer, gas diffusion layer and MEA of the present invention can find applications in chlor-alkali, water electrolysis, hydrohalogenic acid electrolysis, sodium chloride electrolysis, oxygen concentrators, temperature sensors, gas sensors and the like.

Now, specific description will be made below on the present invention on the basis of the examples, but the present invention is not limited by the examples. The evaluation method measurement methods and analysis methods adopted in the present invention are as described below.

(Fuel Cell Evaluation)

An MEA was produced as follows: the gas diffusion electrode in the anode section and the gas diffusion electrode in the cathode section were made to face each other, a sheet of a perfluorosulfonic acid membrane (manufactured by Asahi Kasei Corp.) of 950 in EW and 50 μm in thickness was sandwiched therebetween, and the laminate thus obtained was subjected to hot pressing at 150° C. under an applied pressure of 50 kg/cm$^2$, to yield the MEA.

The MEA was set in a single cell evaluation apparatus as the fuel cell, and a single cell characteristics test was conducted by using hydrogen gas as fuel and air as oxidant under atmospheric pressure, at a cell temperature of 80° C. and a current density of 0.5 A/cm$^2$. The water bubbling method was used for gas humidification, and the air was humidified at room temperature and then supplied to the cell. When the humidification temperature for the hydrogen gas was set at 60° C., the cell voltage and the cell internal resistance obtained by the current interrupt method were measured.

(Observation Through SEM)

A system S-4700 (manufactured by Hitachi, Ltd.) was used for conducting microscopic observation of the individual samples. The individual samples were cut to appropriate sizes, placed on a sample stage, and subjected to Os coating to form samples for microscopic observation for the purpose of the surface analysis of the electrode catalyst layer.

(EDX Measurement)

Individual samples were cut to appropriate sizes and embedded in an epoxy resin, and then subjected to cutting with the aid of an ultramicrotome; the cut samples each were placed on a sample stage with a mirror surface made in the direction of thickness of the electrode catalyst layer, and were subjected to carbon deposition to prepare samples for microscopic observation along the direction of thickness. While each of the samples for microscopic observation was subjected to observation through SEM, the X-ray intensities ascribable to the element Si (originating from $SiO_2$), element S (originating from perfluorosulfonic acid polymer), and element Pt (originating from the catalyst particles) were measured by means of an X-ray analyzer EMAX-7000 (manufactured by Horiba, Ltd.), and thus the distributions of the elements along the direction of thickness were investigated.

(Observation Through TEM)

Individual samples were subjected to microscopic observation by means of a system H-7100 (manufactured by Hitachi, Ltd.). Individual samples were cut to appropriate sizes and embedded in an epoxy resin, and then subjected to cutting with the aid of an ultramicrotome into ultrathin specimens, which were observed at an acceleration voltage of 125 kV.

(XPS Measurement)

An X-ray photoelectron spectroscopic analysis was performed by use of a system PHI 5400 (manufactured by Physical Electronics Inc.). The individual samples were cut to 5 mm dices and the electrode catalyst layer surfaces were subjected to measurement as they were. The measurements conditions included the use of the Mg K$\alpha$ line as an excitation X-ray, the output power of 15 kV×26.6 mA, and the analysis area of 3.5 mm×1 mm. The acquisition region for the conducted survey scan covered the range from 0 to 1,100 eV, and narrow scan was applied to the Si2p and O1s regions. The pass energy for the survey scan was set at 178.9 eV, and that for the narrow scan was set at 35.75 eV.

(Adsorbed Water Content Measurement)

Measurement of the adsorbed water content was conducted by means of an apparatus BELSORP 18 (manufactured by Bel Japan, Inc.). On the basis of the so-called volume method, the adsorption amounts of water to a sample at 30° C. for different relative humidities were derived from the gas pressure variations within the system by use of the equation of state for gas.

Example 1

A 5 mass % perfluorosulfonic acid polymer solution (manufactured by Asahi Kasei Corp., EW: 910, solvent composition (by weight): ethanol/water=50/50) was applied onto a gas diffusion electrode ELAT® (Pt loading of 0.4 mg/cm$^2$, which is the same hereinafter, too) manufactured by E-TEK, Inc., USA., thereafter dried and immobilized at 120° C. in the air atmosphere, and thus an electrode catalyst layer with a polymer loading of 0.8 mg/cm$^2$ was produced. The electrode catalyst layer at this stage was used as a blank electrode. FIG. 1 shows a SEM microgram of the surface of this electrode catalyst layer of the blank electrode. According to this microgram, the electrode catalyst layer is found to be wholly formed of the aggregate of the composite particles in which Pt fine particles as the catalyst particles are supported on conductive carbon particles, and at least part of the surface of the composite particles is found to be covered with the perfluorosulfonic acid polymer layer.

Figure 2:
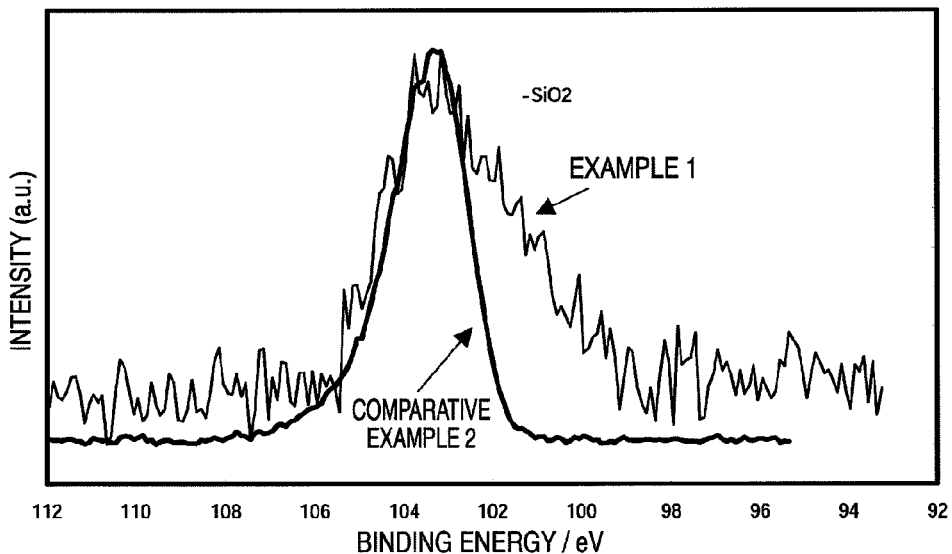
FIG. 2 shows the analysis result 1 (Si2P) for the electrode catalyst layer produced in Example 1 obtained by means of X-ray photoelectron spectroscopy (hereinafter referred to as XPS)
Figure 3:
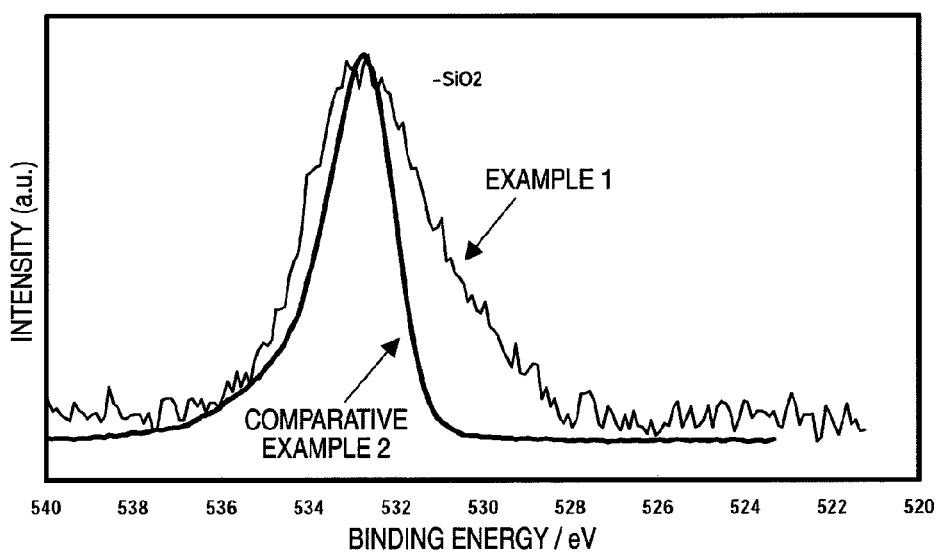
FIG. 3 shows the XPS analysis result 2 (O1s) for the electrode catalyst layer produced in Example 1.
Figure 4:
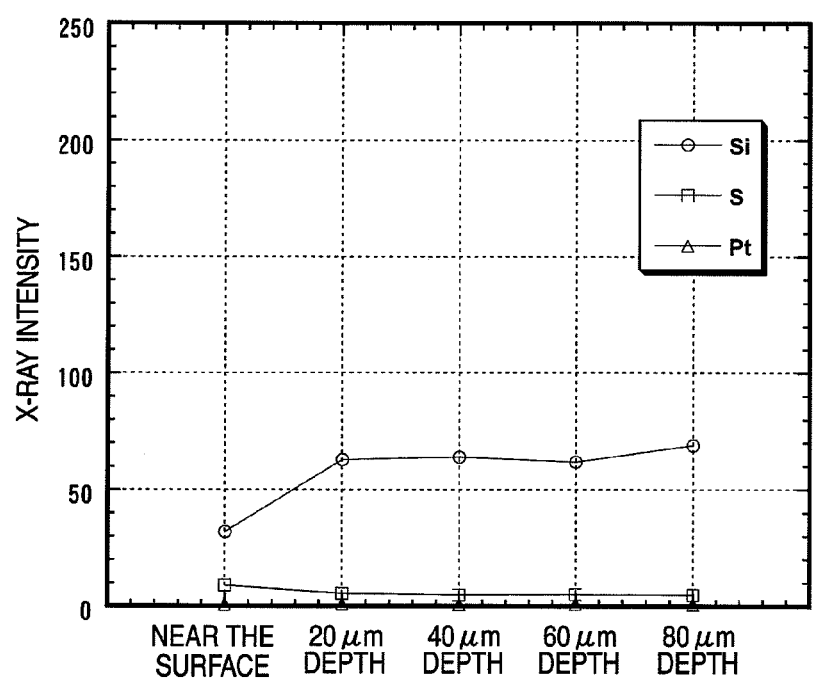
FIG. 4 shows the measurements results obtained for the electrode catalyst layer produced in Example 1 observed along the direction of thickness thereof by means of an energy dispersive X-ray spectrometer (hereinafter referred to as EDX)

The blank electrode was subjected to the following treatments. Specifically, the above described blank electrode was soaked, at room temperature for 1 hour, in a methanol/water mixed solution (1 ml/unit area (cm$^2$) of the catalyst sheet) which had been beforehand prepared in a volume ratio of 1:1, thereafter a tetraethoxysilane/methanol mixed solution ((3 ml/unit area (cm$^2$) of the catalyst sheet) which had been similarly beforehand prepared in a volume ratio of 3:1 was poured into the above described methanol/water mixed solution. The solution thus obtained was further stirred and mixed for 1 minute. Thus, silica was formed in the electrode catalyst layer. Immediately thereafter, the treated electrode was taken out, fully washed with methanol, dried at room temperature for 3 hours, thereafter dried in the air at 120° C. for 1 hour, and thus a gas diffusion electrode constituted with the electrode catalyst layer of the present invention was produced. The mass difference between before and after the above described treatment revealed that silica was loaded in 2.54 in terms of the mass ratio in relation to the perfluoro-sulfonic acid polymer. The surface of the electrode catalyst layer was subjected to XPS measurement. FIG. 2 shows the results obtained from narrow scan of the Si2p region, and FIG. 3 shows the results obtained from narrow scan of the O1s region; the positions of these peaks confirming the presence of silica. Additionally, as a result of the EDX measurement, as FIG. 4 shows, Si was also detected from the depth of the electrode catalyst layer.

Figure 5:
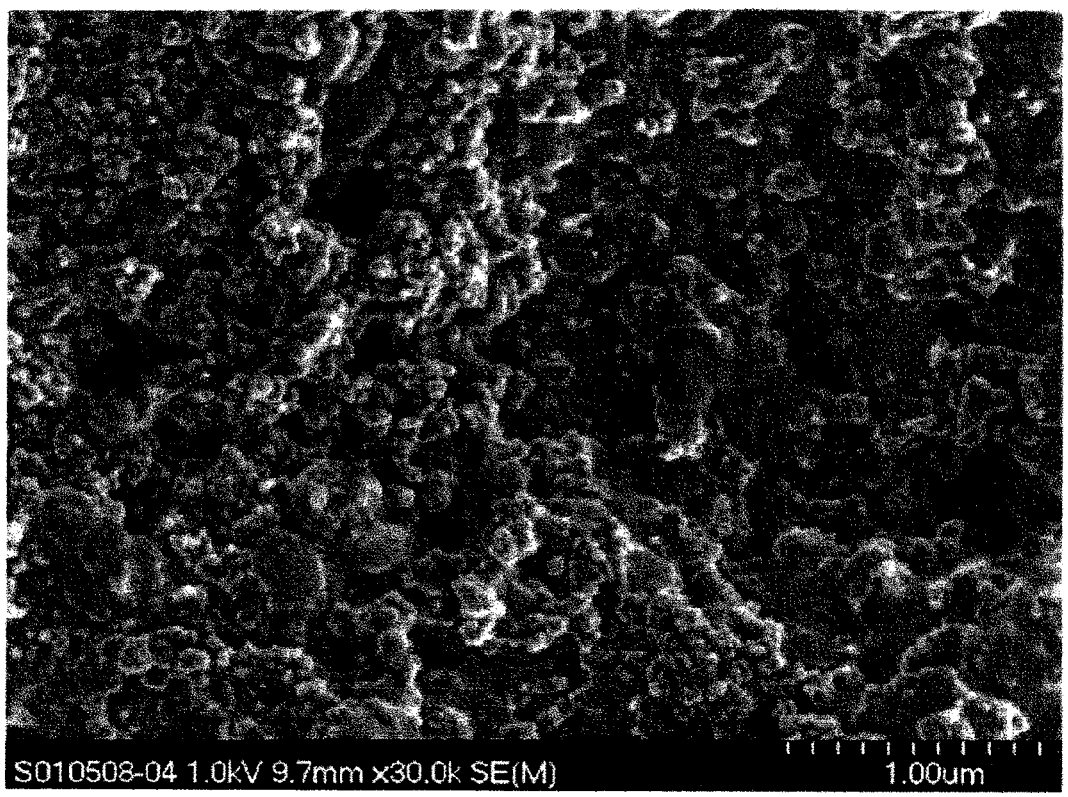
FIG. 5 is a SEM microgram of the surface of the electrode catalyst layer produced in Example 1.
Figure 6:
FIG. 6 is a microgram of the surface of the electrode catalyst layer produced in Example 1 obtained using a transmission electron microscope (hereinafter referred to as TEM)

FIG. 5 shows a SEM microgram of the surface of the electrode catalyst layer. According to FIG. 5, the surface of the electrode catalyst layer of the present invention is the same as that of the blank electrode, and neither particulate nor fibrous silica was observed. Furthermore, FIG. 6 shows a TEM microgram. The conductive carbon particles and Pt catalyst particles were observed, but neither particulate nor fibrous silica was observed.

Figure 7:
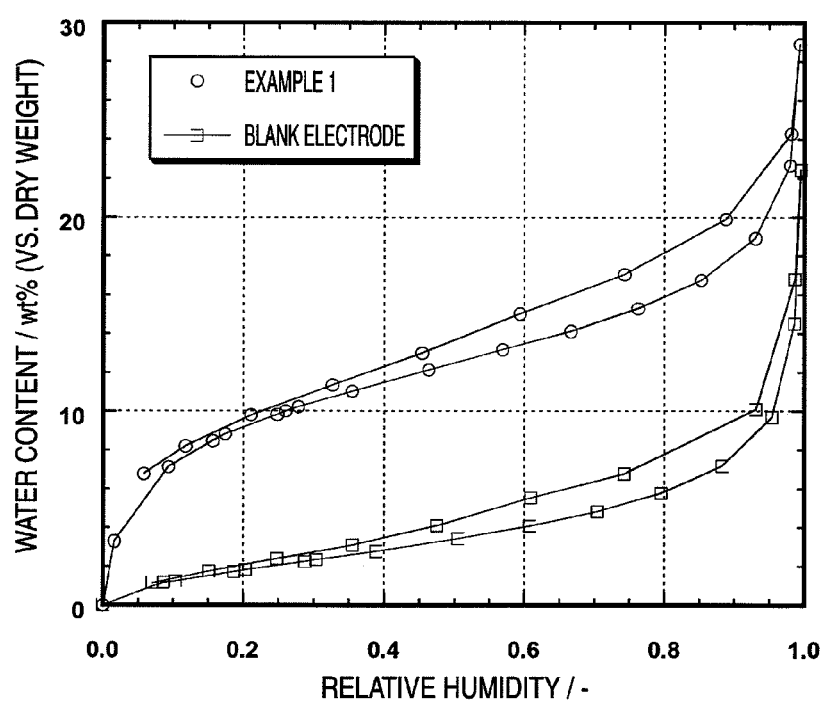
FIG. 7 shows the curves for adsorption of the water content obtained for a gas diffusion electrode and the blank electrode produced in Example 1.

FIG. 7 shows the results obtained from the adsorbed water content measurement on the gas diffusion electrode of the present invention and the blank electrode; as can be confirmed from FIG. 7, the gas diffusion electrode of the present invention exhibited a higher water content than the blank electrode, and additionally maintained a high water content even at a low humidity.

A fuel cell with the anode and cathode both adopting the gas diffusion electrode of the present invention was evaluated, thus obtaining a cell voltage of 0.54 V and a cell internal resistance of 0.10 $\Omega$cm$^2$. The results thus obtained are shown in Table 1.

Example 2

A fuel cell with the anode adopting the gas diffusion electrode of the present invention and the cathode adopting the blank electrode was evaluated, thus obtaining a cell voltage of 0.51 V and a cell internal resistance of 0.11 $\Omega$cm$^2$. The results thus obtained are shown in Table 1.

Example 3

A fuel cell with the anode adopting the blank electrode and the cathode adopting the gas diffusion electrode produced in Example 1 was evaluated, thus obtaining a cell voltage of 0.51 V and a cell internal resistance of 0.11 $\Omega$cm$^2$. The results thus obtained are shown in Table 1.

Example 4

To 0.519 g of a Pt-supporting carbon (TEC10E40E, 36.4 wt % Pt, manufactured by Tanaka Kikinzoku Co., Ltd.) as a composite particle material, 3.78 g of a perfluorosulfonic acid polymer solution was added, and the mixture thus obtained was fully mixed together by means of a homogenizer. The dispersion thus obtained was applied onto a sheet of a carbon paper (TGP-H-060, manufactured by Toray Industries, Inc.) by screen printing, dried at room temperature for 1 hour and then in the air at 140° C. for 1 hour, and thus a polymer-containing aggregate of the order of 10 μm in thickness was obtained. In the polymer-containing aggregate, the Pt loading was 0.3 mg/cm$^2$, the polymer loading was 0.3 mg/cm$^2$, and the gas diffusion electrode thus obtained was used as a reference electrode.

The reference electrode was subjected to the following treatment. Specifically, the above described electrode was soaked, at room temperature for 1 hour, in a methanol/water mixed solution (1 ml/unit area (cm$^2$) of the catalyst sheet), which had been beforehand prepared in a volume ratio of 1:3, thereafter a tetraethoxysilane/methanol mixed solution (3 ml/unit area (cm$^2$) of the catalyst sheet), which had been similarly beforehand prepared in a volume ratio of 3:1, was poured into the above described methanol/water mixed solution, the solution thus obtained was further stirred and mixed for 5 seconds, and thus silica was formed in the polymer-containing aggregate. Immediately thereafter, the treated electrode was taken out, fully washed with methanol, dried at room temperature for 3 hours, thereafter dried in the air at 120° C. for 1 hour. Thus, a gas diffusion electrode constituted with the electrode catalyst layer of the present invention was produced. The mass difference between before and after the above described treatment revealed that the silica loading was 0.3 mg/cm$^2$, and the loading amount was 1.00 in terms of the mass ratio in relation to the perfluorosulfonic acid polymer.

A fuel cell with the anode and cathode both adopting the gas diffusion electrode was evaluated, thus revealing that the electric power generation characteristics were better than the characteristics of a cell with the anode and cathode both adopting the reference electrode, and the cell voltage was improved by 0.066 V at the current of 0.5 A/cm$^2$.

Comparative Example 1

A fuel cell with the anode and cathode both adopting the blank electrode was evaluated, thus obtaining a cell voltage of 0.43 V and a cell internal resistance of 0.18 Ωcm$^2$.

Comparative Example 2

Figure 8:
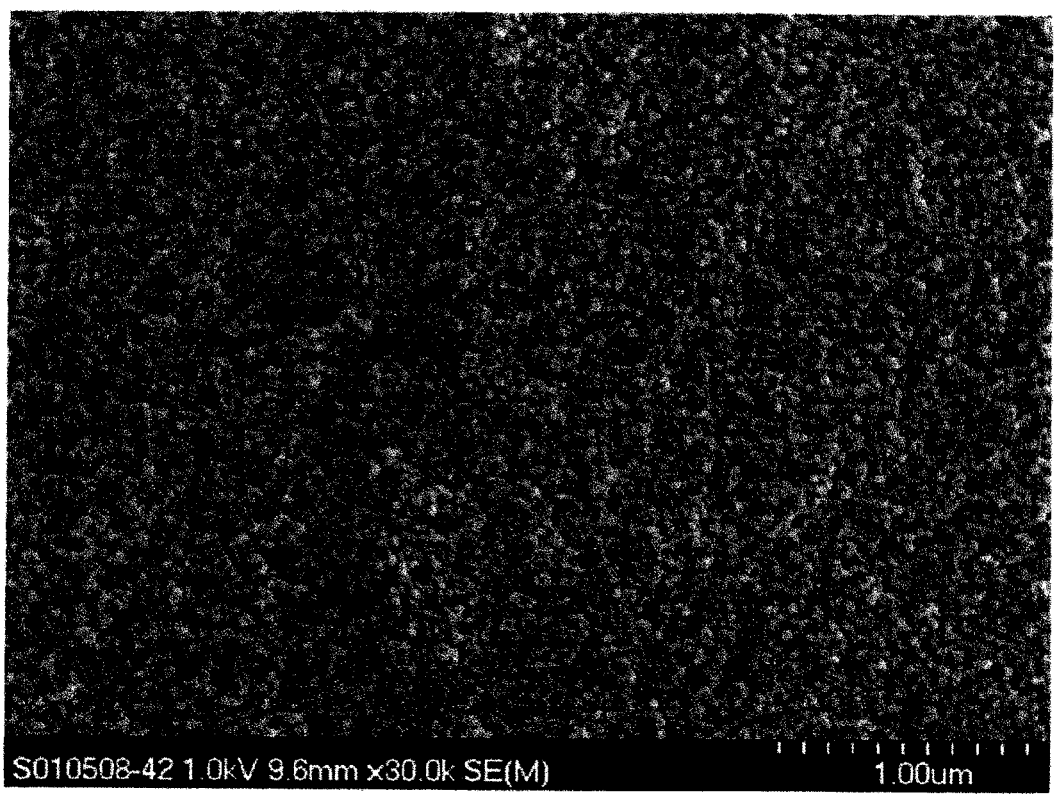
FIG. 8 is a SEM microgram of the surface of the electrode catalyst layer produced in Example 2.
Figure 9:
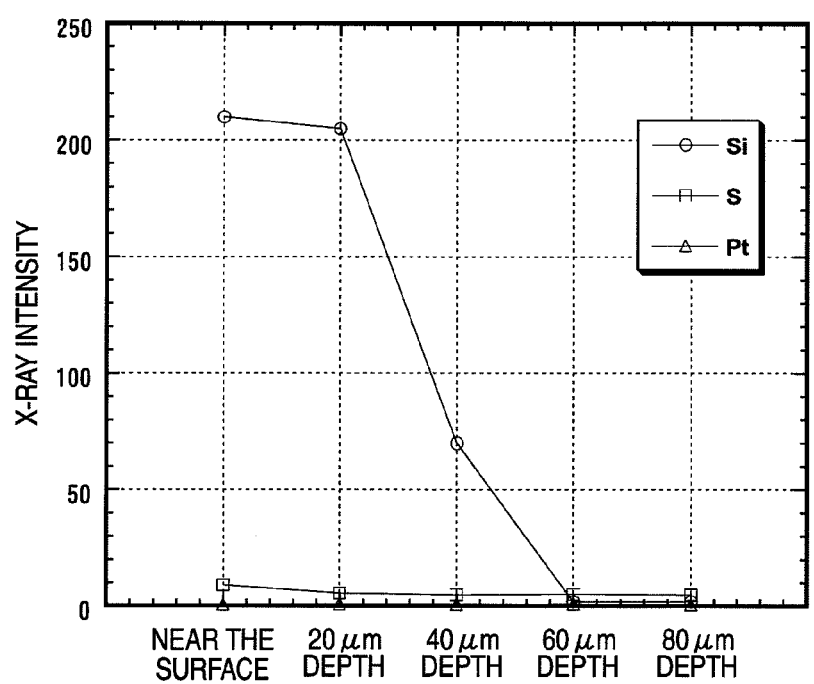
FIG. 9 shows the EDX measurement results obtained for the electrode catalyst layer produced in Example 2 by observing along the direction of thickness thereof.

A dispersion was prepared in which a fine silica particle material (Aerosil® 380, manufactured by Japan Aerosil Co., Ltd., average primary particle size 0.007 μm) was dispersed in a 5 mass % solution of perfluorosulfonic acid polymer in such a way that the mass ratio between the polymer and silica was 3:1. The dispersion thus prepared was applied onto a gas diffusion electrode ELAT® (manufactured by E-TEK, Inc., USA.), thereafter dried at room temperature for 3 hours and then dried at 120° C. in the air for 1 hour. Thus, a gas diffusion electrode constituted with a catalyst layer based on a conventional method was obtained. The mass difference between before and after the application of the dispersion revealed that the fine silica particle material (Aerosil® 380, manufactured by Japan Aerosil Co., Ltd.) was loaded in 2.55 in terms of the mass ratio in relation to the perfluorosulfonic acid polymer. FIG. 7 shows an electron micrograph of the surface of this electrode catalyst layer. As shown in FIG. 7, there is observed the condition that the surface of the catalyst layer is wholly covered with a layer of the silica fine particles. As the EDX measurement results in FIG. 8 show, silica was revealed to be unevenly distributed near the surface.

With the anode and cathode both adopting this gas diffusion electrode, production of an MEA was unsuccessfully attempted such that the catalyst layers were not transcribed to the two surfaces of the membrane, respectively.

Comparative Example 3

A gas diffusion electrode constituted with the catalyst layers based on a conventional method was produced in a manner similar to that in Comparative Example 2, except that the silica fine particle material was loaded in 0.08 in terms of the mass ratio in relation to the perfluorosulfonic acid polymer. According to the electron microscopic observation, similarly to Comparative Example 2, there was observed the condition that the surface of the catalyst layer was covered with a silica fine particle layer.

A fuel cell with the anode and cathode both adopting the gas diffusion electrode was evaluated, thus obtaining a cell voltage of 0.47 V and a cell internal resistance of 0.18 Ωcm$^2$.

Comparative Example 4

To 0.519 g of a Pt-supporting carbon (TEC10E40E, 36.4 wt % Pt, manufactured by Tanaka Kikinzoku Co., Ltd.) as a composite particle material, 7.56 g of a perfluorosulfonic acid polymer solution and 0.019 g of the same silica fine particle material as was used in Comparative Example 1 were added, and the mixture thus obtained was fully mixed together by means of a homogenizer. The dispersion solution thus obtained was applied onto a sheet of PTFE by screen printing, dried at room temperature for 1 hour, thereafter dried in the air at 120° C. for 1 hour, and thus a catalyst layer of the order of 10 μm in thickness was obtained. In the catalyst layer, the Pt loading was 0.4 mg/cm$^2$, the polymer loading was 0.8 mg/cm$^2$, and the silica loading was 0.04 mg/cm$^2$ and 0.05 in terms of the mass ratio in relation to the perfluorosulfonic acid polymer.

A fuel cell with the anode and cathode both adopting the catalyst layer was evaluated, thus revealing that the performance was poor, the voltage fluctuation was large, and additionally the current density was not able to be elevated up to 0.5 A/cm$^2$. At a current density of 0.2 A/cm$^2$, the cell voltage was found to be 0.36 V and the cell internal resistance was found to be 0.39 Ωcm$^2$. The results obtained are shown in Table 1.

Comparative Example 5

A catalyst layer was produced in a manner similar to that in Comparative Example 4, except that the dispersion was prepared by adding 0.960 g of the silica fine particle material; the Pt loading was 0.4 mg/cm$^2$, the polymer loading was 0.8 mg/cm$^2$, and the silica loading was 2.03 mg/cm$^2$ and 2.54 in terms of the mass ratio in relation to the perfluorosulfonic acid polymer.

A fuel cell with the anode and cathode both adopting the catalyst layer was evaluated, thus revealing that the performance was poor, the voltage variation was large, and additionally even a current of 0.1 A/cm$^2$ was not able to be obtained. The results obtained are shown in Table 1.

Comparative Example 6

A sheet of a perfluorosulfonic acid membrane (manufactured by Asahi Kasei Corp.) of 950 in EW and 50 μm in thickness was dried in a vacuum oven at 100° C. for 24 hours. The membrane sample was soaked for 1 hour in a methanol/water mixed solution (1 cm$^3$/unit area of the membrane (cm$^2$)) prepared in a volume ratio of 2:1, thereafter a tetraethoxysilane/methanol mixed solution (3 cm$^3$/unit area of the membrane (cm$^2$)) prepared in a volume ratio of 3:2 was poured into the above described methanol/water mixed solution, the solution thus obtained was further stirred and mixed for 1 minute. Thus, silica was formed in the membrane. Then, the membrane was dried in a vacuum oven at 100° C. for 24 hours. The mass variation between before and after the above described treatment revealed that silica was loaded in 0.05 in terms of the mass ratio in relation to the perfluorosulfonic acid membrane. The silica composite membrane thus obtained was sandwiched between two blank electrodes and subjected to hot pressing at 150° C. under an applied pressure of 50 kg/cm$^2$, to yield an MEA. A fuel cell evaluation conducted by use of the MEA revealed that the performance was poor such that the cell voltage was 0.33 V and the cell internal resistance was 0.22 Ωcm$^2$.

TABLE 1

| | MEA | | | Cell voltage V | Internal resistance $\Omega\ cm^2$ |
|---|---|---|---|---|---|
| | Anode | Cathode | Ion exchange membrane | | |
| Example 1 | Present invention | Present invention | Perfluorosulfonic acid membrane | 0.54 | 0.10 |
| Example 2 | Present invention | Blank | Perfluorosulfonic acid membrane | 0.51 | 0.11 |
| Example 3 | blank | Present invention | Perfluorosulfonic acid membrane | 0.51 | 0.11 |
| Comparative Example 1 | blank | Blank | Perfluorosulfonic acid membrane | 0.43 | 0.18 |
| Comparative Example 2 | Conventional method | Conventional method | Perfluorosulfonic acid membrane | MEA production impossible | |
| Comparative Example 3 | Conventional method | Conventional method | Perfluorosulfonic acid membrane | 0.47 | 0.18 |
| Comparative Example 4 | Conventional method | Conventional method | Perfluorosulfonic acid membrane | Limiting current density: 0.2 A/cm² | |
| Comparative Example 5 | Conventional method | Conventional method | Perfluorosulfonic acid membrane | Limiting current density: 0.1 A/cm² | |
| Comparative Example 6 | | | Silica composite membrane | 0.33 | 0.22 |

INDUSTRIAL APPLICABILITY

The use of the electrode catalyst layer of the present invention makes it possible to stably operate the fuel cell and improve the electric power generation performance even under a condition of low humidification.

The invention claimed is:

1. A method of making an electrode catalyst layer comprising:
    preparing a catalyst dispersion comprising at least a composite particle material comprising catalyst particles supported on conductive particles, a perfluorocarbon polymer and a medium;
    drying and solidifying said catalyst dispersion to form a polymer-containing aggregate;
    adding at least one of an oxide precursor of an oxide selected from the group consisting of $Al_2O_3$, $B_2O_3$, $SiO_2$, $TiO_2$, $Y_2O_3$, $ZrO_2$, $Zr_2O_3$ and $ZrSiO_4$ in the catalyst dispersion to form a mixture; and
    applying said mixture to a substrate.

2. The method of making an electrode catalyst layer according to claim 1, wherein part of said catalyst particles is coated with the perfluorocarbon polymer.

3. The method of making an electrode catalyst layer according to claim 1, wherein said perfluorocarbon polymer contains an oxide selected from the group consisting of $Al_2O_3$, $B_2O_3$, $SiO_2$, $TiO_2$, $Y_2O_3$, $ZrO_2$, $Zr_2O_3$ and $ZrSiO_4$.

4. The method of making an electrode catalyst layer according to claim 1, wherein said oxide is silica.

5. The method of making an electrode catalyst layer according to claim 1, wherein the mass ratio of the oxide to the perfluorocarbon polymer is from 0.001 to 50.

6. The method of making an electrode catalyst layer according to claim 1, wherein said oxide is obtained by subjecting an alkoxide to hydrolysis and polycondensation reactions.

7. The method of making an electrode catalyst layer according to claim 6, wherein said hydrolysis reaction is conducted under an acidic condition.

8. The method of making an electrode catalyst layer according to claim 1, wherein two or more of said oxide precursor are used.

9. The method of making an electrode catalyst layer according to claim 1, wherein said medium is selected from the group consisting of water, ethanol, ethyleneglycol, propyleneglycol, glycerin, dimethylsulfoxide, and composite mediums containing a mixture thereof.

10. The method of making an electrode catalyst layer according to claim 1, wherein said substrate is selected from the group consisting of an ion exchange polymer membrane, a gas diffusion layer and a PTFE membrane.

* * * * *